(12) United States Patent
Bode et al.

(10) Patent No.: US 6,937,404 B2
(45) Date of Patent: Aug. 30, 2005

(54) VEHICLE WINDOW PROVIDING MULTIPLE OPERATOR VIEWING ANGLES

(75) Inventors: Shane Elizabeth Bode, Seymour, IN (US); Alan Harold Batman, Madison, IN (US); Russell Lewis Tartock, Saint Peters, MO (US)

(73) Assignee: Grote Industries, Inc., Madison, IN (US)

( * ) Notice: Subject to any disclaimer, the term of this patent is extended or adjusted under 35 U.S.C. 154(b) by 0 days.

(21) Appl. No.: 10/717,777

(22) Filed: Nov. 20, 2003

(65) Prior Publication Data

US 2005/0111114 A1 May 26, 2005

(51) Int. Cl.[7] .................................. G02B 3/08
(52) U.S. Cl. ........................................ 359/742
(58) Field of Search ..................... 359/707, 742, 359/743

(56) References Cited

U.S. PATENT DOCUMENTS

| 3,809,461 A | 5/1974 | Baumgardner et al. |
| 3,972,596 A | 8/1976 | Baumgardner et al. |
| 4,007,958 A | * 2/1977 | Peifer et al. .............. 296/190.1 |
| 4,358,182 A | 11/1982 | Hayes et al. |
| 4,439,021 A | * 3/1984 | Gross .......................... 359/726 |
| 4,787,722 A | * 11/1988 | Claytor ....................... 359/742 |
| 4,900,914 A | 2/1990 | Raff et al. |
| 4,906,082 A | 3/1990 | Gold |
| 5,138,495 A | * 8/1992 | Shiono et al. .............. 359/742 |
| 5,680,261 A | 10/1997 | Furst |
| 5,706,107 A | 1/1998 | Smith |
| 6,101,048 A | 8/2000 | Wheeler |
| 6,176,602 B1 | 1/2001 | Pastrick et al. |
| 6,196,689 B1 | 3/2001 | Brown et al. |

* cited by examiner

*Primary Examiner*—Scott J. Sugarman
*Assistant Examiner*—Darryl J. Collins
(74) *Attorney, Agent, or Firm*—Woodard, Emhardt, Moriarty, McNett & Henry LLP

(57) ABSTRACT

A vehicle window includes a first window side and a second window side. The first window side includes an optical center and a plurality of grooves positioned about the optical center. The grooves have a number of dimensions including a depth and a width. The grooves define surfaces effective to redirect light that passes through said window. At least one dimension of the grooves is varied about the optical center. The window is effective to provide a plurality of angles of light redirection about the optical center.

19 Claims, 6 Drawing Sheets

VEHICLE WINDOW PROVIDING MULTIPLE OPERATOR VIEWING ANGLES

TECHNICAL FIELD OF THE INVENTION

The invention relates to a window for providing a number of different operator viewing angles to reduce or eliminate blind areas on the passenger side of a semi. More specifically, the invention relates to a window installable in a porthole in the passenger door of a semi for providing a number of different operator viewing angles to reduce or eliminate blind areas on the passenger side of a semi.

BACKGROUND OF THE INVENTION

Semi tractor-trailer trucks, or semis, are of indispensable economic value. An overwhelming number of the goods available in the market are transported using semis at one time or another. The capacity and flexibility of semis makes them well suited for delivery of items to locations not in close proximity to other transportation means. Unfortunately, the operation of semis is not without risk. Semis share roadways with vehicles that are a fraction of their size. Pedestrians and other objects are even smaller relative to semis. Of course, a semi operator must avoid contacting all obstacles regardless of their size or position. Currently, however, there exist blind areas on the passenger side of semis which prevent operators from viewing certain obstacles. Such blind areas create a substantial risk that a semi operator will be unable to see an obstacle and will, therefore, be unable to avoid contacting it. This may result in injury, death and/or property damage.

Some efforts have been made to address the problems created by blind areas of semis. Additional mirrors have been provided for mounting on the exterior of a semi to increase visibility. This technique suffers from numerous limitations. For example, the filed of view provided is limited, and is nonexistent in the forward direction. Furthermore, the cost associated with obtaining and installing additional mirrors makes this technique unattractive.

Another proposal to address blind areas contemplates using a conventional window installed in a porthole in the passenger side door in combination with a beveled mirror mounted on the exterior of the semi to provide some visibility. This proposal suffers from the limitations described above and, furthermore, the increased number of components makes this proposal even more costly.

A further proposal to address a blind area contemplates using a conventional window in a porthole in the passenger side door in combination with additional optical devices glued to the window and/or mounted adjacent to the window with additional gaskets or other parts to uniformly redirect the viewing angle. This proposal suffers from the limitations described above as well as adding undesirable distortion to images viewed through the combined system. Accordingly, it can be seen that there remains a need for improvements in the art.

SUMMARY OF THE INVENTION

One embodiment of the present invention includes a unique window for a vehicle. Another embodiment of the present invention includes a unique window for a vehicle including optics for reducing and/or eliminating a blind area of the vehicle.

A further embodiment of the present invention includes a vehicle window including a first side and a second side. The first side includes an optical center and a number of grooves positioned about the optical center. The grooves have a number of dimensions including depth and width. The grooves define surfaces effective to redirect light that passes through the window. At least one dimension of the grooves is varied about the optical center. The window provides a plurality of angles of light redirection about the optical center.

An additional embodiment of the present invention includes a vehicle door window including first and second sides. The first side includes an optical center and a plurality of ridges positioned about the optical center. The ridges have a number of dimensions including height and pitch. The ridges defining surfaces that redirect light that passes through the window. At least one dimension of the ridges is varied about the optical center. The window provides a plurality of angles of light redirection about the optical center.

Yet another embodiment of the present invention includes a vehicle porthole window including a first and second sides. The first side includes a center and number of grooves positioned about the center. The grooves have a number of dimensions including depth and width. The grooves define fresnel optical surfaces effective to redirect light that passes through the window. At least one dimension of the grooves is substantially continuously varied about the optical center. The window provides a plurality of angles of light redirection about the optical center.

It is one object of the present invention to provide a unique window for a vehicle. It is a further object of the present invention to provide a unique window for a vehicle including optics for reducing and/or eliminating a blind area of the vehicle. Other objects, embodiments, forms, features, advantages, benefits, and aspects of the present invention shall become apparent from the detailed description and drawings provided herewith.

DETAILED DESCRIPTION OF SELECTED EMBODIMENTS

Figure 1:
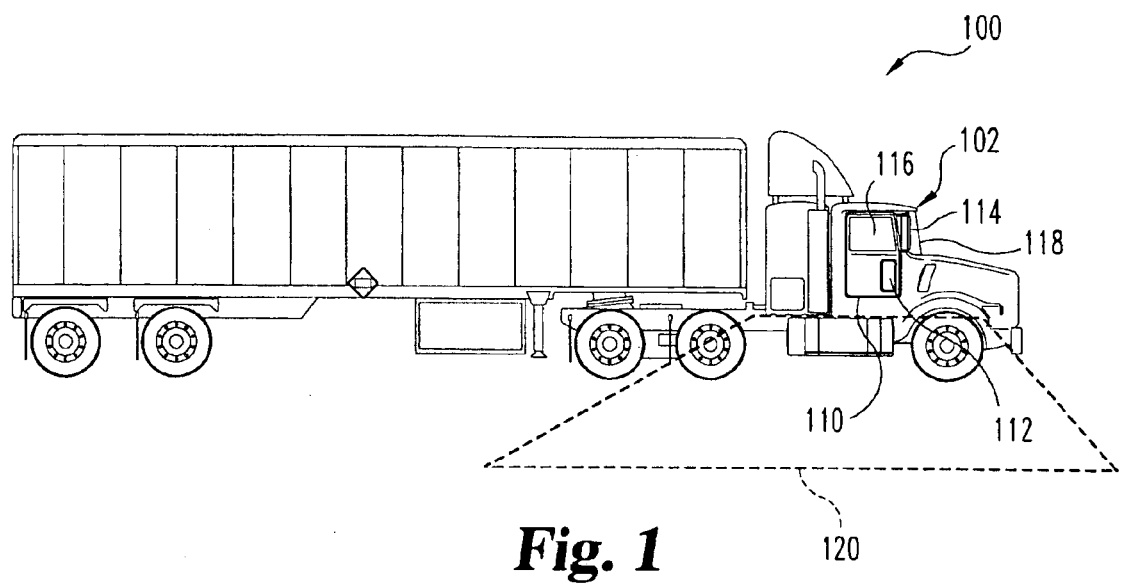
FIG. 1 is a passenger side view of a semi tractor-trailer truck according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 shows a semi tractor-trailer truck 100 which includes one embodiment of the present invention. Truck 100 includes a tractor cab 102 in which a truck operator sits in order to operate truck 100. Cab 102 includes passenger side window 116, passenger side mirror 114 and front window 118. Windows 116 and 118, and mirror 114 permit an operator of truck 100 to view some areas about the exterior of the truck 100. However, there remains a blind area 120 which windows 116 and 118 and mirror 114 do not permit the operator of truck 100 to view.

Blind area 120 extends along both the fore and aft directions along the length of truck 100 as well as vertically along the height of truck 100. Additionally, blind area 120 extends out from the side of the truck 100 in a direction pointing out of the paper on which FIG. 1 is printed. Thus, blind area 120 is a three dimensional region that cannot be viewed by an operator of truck 100 using windows 116 and 118 and/or mirror 114.

Blind area 120 shown in FIG. 1 is but one example of many blind areas that presently exist for semi tractor-trailer trucks. The dimensions and extent of such blind areas depend upon and vary with many factors, including: the type, design, size, shape and/or configuration of truck 100 and cab 102; the size, shape, design, configuration, and placement of windows 116 and 118; the size, shape, optical features, placement and adjustment of mirror 114; the operation position, physical attributes and operation style of the operator of truck 100; and other conventional considerations. Thus, the dimensions and extent of semi blind areas will vary according to these and other factors. Additionally multiple blind areas may exist for a semi truck.

According to one embodiment of the present invention, cab 102 of truck 100 includes window 112 which is mounted to occupy a porthole formed in passenger door 110. Window 112 reduces and/or eliminates blind area 120 by redirecting light that passes through it, thus permitting an operator of vehicle 100 to view a portion or all of blind area 120. It can be seen that blind area extends in several directions relative to window 112. Thus, window 112 provides multiple redirected viewing angles for an operator of truck 100. The specific redirection characteristics of window 112 conform with the needs presented by the location, dimensions and extent of blind area 120.

Figure 2:
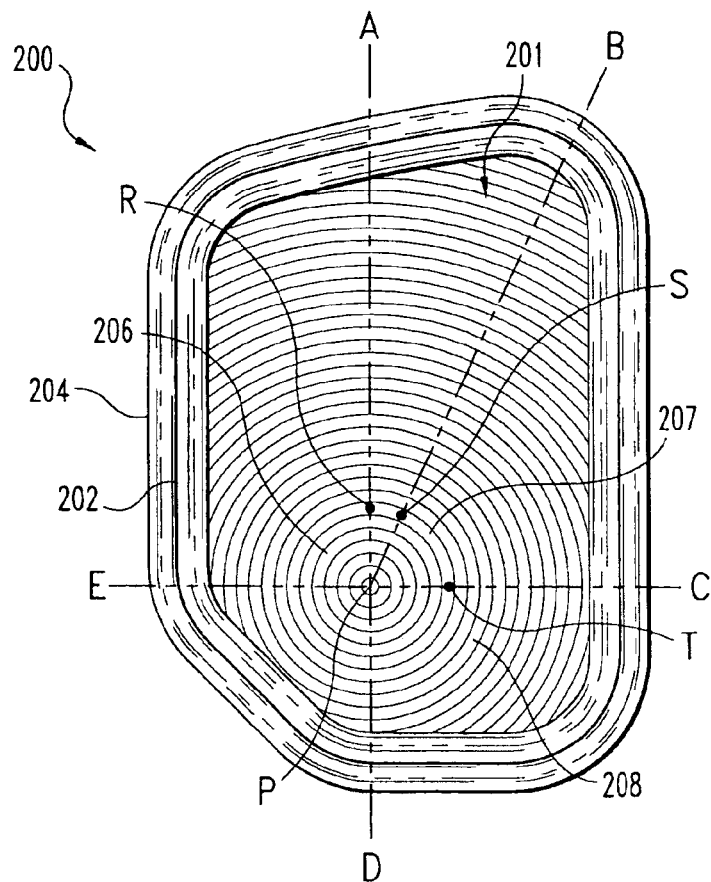
FIG. 2 is an interior view of a vehicle window according to another embodiment of the present invention.

FIG. 2 shows an interior view of a vehicle window assembly 200 according to one embodiment of the present invention. Assembly 200 is configured to be received in a porthole provided in the passenger side door of a truck and may be, for example, in the position of window 112 of FIG. 1 or in other positions. Assembly 200 includes a one-piece window 201 that may be formed of polycarbonate or any other transparent material and a one piece gasket 204 for forming a seal between window 201 and the porthole. It will be understood that use unconventional materials might require a showing of compliance with regulatory safety standards. Gasket 204 includes a contour 202 that maintains the window 201 approximately at the plane of the exterior of the semi door when the assembly 200 is installed and simultaneously allows other portions of gasket 204 to extend inwardly so that a seal may be formed. Window 201 has interior and exterior surfaces that redirect light that passes through window 201. Furthermore, as explained below, the interior side of window 201 defines ridges and/or grooves about an optical center P which provide multiple redirected operator lines of sights through window 201 about optical center P by redirecting light that passes through window 201.

The optics of window 201 are blended to provide multiple redirected lines of sight through different portions of window 201. For example, the portion of window 201 bounded by line segments P-A and P-C includes optics that provide redirected operator lines of sight generally in the up and aft directions. The portion of window 201 bounded by line segments P-C and P-D includes optics that provide redirected operator lines of sight generally in the down and aft directions. The portion of window 201 bounded by line segments P-D and P-E include optics that provide redirected operator lines of sight generally in the down and fore directions. The portion of window 201 bounded by line segments P-E and P-A includes optics that provide redirected operator lines of sight generally in the up and fore directions.

The lines of sight within any of the above portions may vary as well. For example, the portion of window 201 bounded by line segments P-A and P-B provides redirected lines of sight generally more in the up direction than the portion of the window bounded by line segments P-B and P-C and the redirected operator lines of sight of the later of these two portions are generally more in the aft direction than are those of the former. Furthermore, it should be understood that the redirection of operator line of sight provided by any arbitrarily defined portion of window 201 might be compared to that of any other arbitrarily defined portion. Additionally, single points of window 201 may be compared in terms of the optical redirection that they provide. It should be understood, however that optics of window 201 may provide relatively smooth and continuous transitions between varying redirected operator lines of sight so as to minimize distortion.

Window 201 includes multiple optical rings that represent ridges and/or grooves on the interior side of window 201 disposed about optical center P. For clarity of illustration and description only rings 206, 207 and 208 have been numbered, however, it should be understood that numerous other similarly illustrated optical rings are included in window 201. Furthermore, the optical rings of window 201 have been shown as having a sufficiently large size for clarity of illustration. It should be understood, however, that the ridges and/or grooves of window 201 may be of a smaller size than apparent in FIG. 2. As shown in FIG. 2. the optical rings of window 201 are disposed about optical center P in a circular concentric configuration. It should be understood, however, that other configurations, such as, for example, non-circular and/or non-concentric are within the scope of the invention.

Figure 3A:
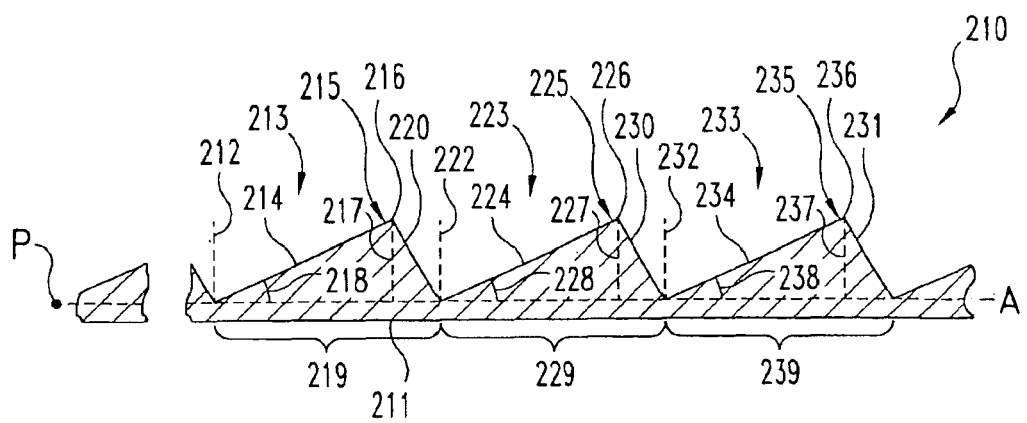
FIG. 3A is a partial sectional view of the window of FIG. 2 taken along line segment P-A.
Figure 3B:
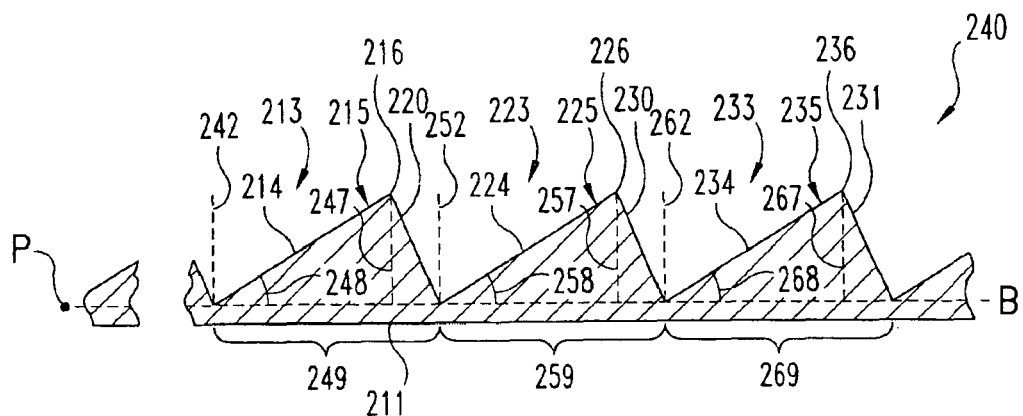
FIG. 3B is a partial sectional view of the window of FIG. 2 taken along line segment P-B.
Figure 3C:
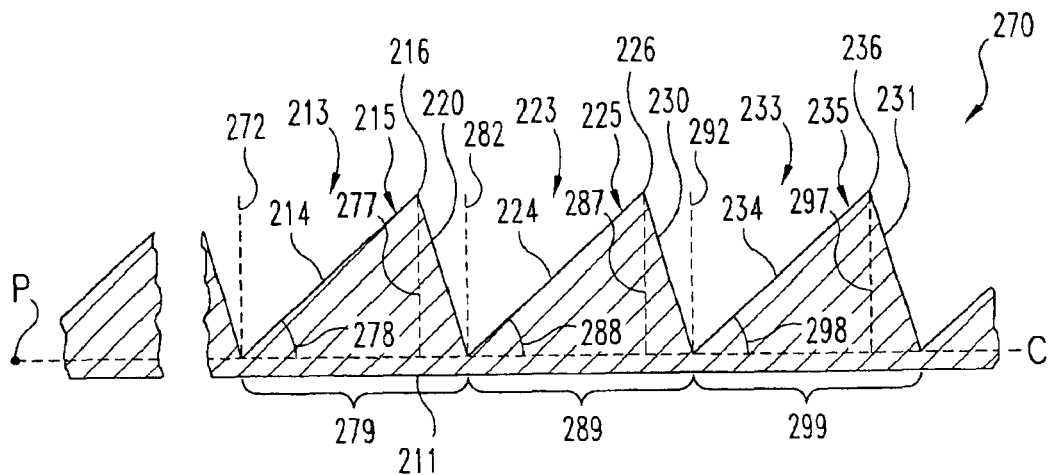
FIG. 3C is a partial sectional view of the window of FIG. 2 taken along line segment P-C.

Referring now to FIGS. 3A, 3B and 3C window 201 will be further described. FIGS. 3A, 3B and 3C show partial cross sections 210, 240 and 270, respectively, of window 201 taken along lines P-A, P-B and P-C, respectively. FIGS. 3A, 3B and 3C show that one side of window 201 is a substantially planar surface 211. When installed, surface 211 faces the exterior of a vehicle. The opposing side of window 201 includes ridges 215, 225 and 235 and grooves 213, 223 and 233. These ridges and grooves define surfaces 214, 220, 224, 230, 234 and 231. Furthermore, ridges 215, 225 and 235 include ridge peaks 216, 226, and 236, respectively. It should be understood that window 201 includes numerous other ridges and groves and that only ridges 215, 225 and 235 and grooves 213, 223 and 233 have been illustrated and described for the sake of clarity of illustration and description.

Turning now specifically to FIG. 3A various dimensions of the ridges and grooves of window 201 will be described. For example, in the cross section taken along the line P-A, ridges 215, 225 and 235 can be described by their heights which are indicated by dashed line segments 217, 227 and 237, respectively. In the same cross section, ridges 215, 225 and 235 can be described by their pitches which are indicated by braces 219, 229 and 239, respectively. In the same cross section, grooves 213, 223 and 233 can be described by their depths which are indicated by dashed line segments 212, 222 and 232, respectively. Additionally, in the same cross section, grooves 213, 223 and 233 can be described by their widths which can be indicated by the distance between successive ridge peaks. For example, the maximum width of groove 223 is the distance between ridge peak 216 and ridge peak 226. Still in the cross section taken along line P-A, ridges 215, 225 and 235, can be further described in terms of angles 218, 228 and 238, respectively. Angles 218, 228 and 238 indicate the angular position of surfaces 213, 223 and 233, respectively, relative to the line P-A. Angles 218, 228 and 238 can similarly be used to describe grooves 213, 223 and 233.

With continued reference to FIG. 3A, it can be seen that the heights 217, 227 and 237 are substantially the same. Thus, the height of ridges along the length of line segment P-A may be substantially constant. It is also contemplated, however, that the heights 217, 227 and 237 could vary. For example, the heights could successively increase such that height 227 was greater than height 217 and height 237 was greater than height 227. Alternatively, the heights of successive ridges may decrease successively or vary in a non-successive manner. Furthermore, it should be understood that depths 212, 222 and 232 may vary in a corresponding way.

As shown in FIG. 3A, the pitches 219, 229 and 239 of ridges 215, 225 and 235, respectively, are substantially the same and could be, for example, approximately 1.3 millimeters. Thus, in the cross section of line segment P-A, the ridges of window 201 are of a constant pitch. It is contemplated, however, that the pitches of the ridges of window 201 may vary. For example, the magnitude successive pitches might increase such that the magnitude of pitch 229 was greater than that of pitch 219 and the magnitude of pitch 239 was greater than that of pitch 229. Still other variations in pitch are contemplated, for example, pitches might successively decrease or vary in a non-successive manner. Additionally, it should be understood that the grooves of window 201 may vary in a similar manner.

Referring now additionally to FIGS. 3B and 3C, variation of the ridges 215, 225 and 235 and grooves 213, 223 and 233 about optical center P will be described. FIG. 3B shows a partial cross section window 201 taken along the line segment P-B. In FIG. 3B ridges 215, 225 and 235 have heights 247, 257 and 267, respectively. Heights 247, 257 and 267 are of a greater magnitude than heights 217, 227 and 237, respectively. Thus, the height of each ridge 215, 225 and 235 increases about optical center P from the cross section of FIG. 3A to the cross section of FIG. 3B.

FIG. 3C shows a partial cross section of ridges 215, 225 and 235 and grooves 213, 223 and 233 taken along the line segment P-C. In the view of FIG. 3C ridges 215, 225 and 235 have heights 277, 287 and 297, respectively. Heights 277, 287 and 297 are greater than 247, 257 and 267, respectively. Thus, the height of each ridge 215, 225 and 235 increases about optical center P from the cross section of FIG. 3B to the cross section of FIG. 3C. The variation in heights of ridges is preferably continuous and smooth over certain ranges. Thus, for example, the height of ridge 215 continuously increases from height 217 at line segment P-A to height 247 at line segment P-B to height 277 at line segment P-C. It should be understood that the heights of ridges 225 and 235 vary in a similar fashion about optical center P. Thus transition from height 227 to 257 to 287 and from height 237 to 267 to 297 is smooth and continuous. It should be understood, however, that the rate and magnitude of increase or decrease for any given ridge of window 201 need not be identical to that of other ridges.

It should be understood that the variation of heights of ridges over all ranges about optical center P is not a continuous and smooth height increase for all ranges that may be defined. For example, over one range, the height of a ridge will continuously and smoothly decrease. Furthermore, over another range, the height of a ridge may first continuously and smoothly decrease and then continuously and smoothly increase, or vice-versa. The nature of the variation in height of ridges about optical center P is provided to conform with the optical characteristics of window 201 and the blind area sought to be addressed. Additionally, it should be appreciated that the grooves of window 201 vary in a manner analogous to that described for its ridges. Thus, groove 213 may smoothly and continuously increase from depth 212 to 242 to 272; groove 223 may smoothly and continuously increase from depth 222 to 252 to 282, and groove 233 may smoothly and continuously increase from depth 232 to 262 to 292.

Figure 3D:
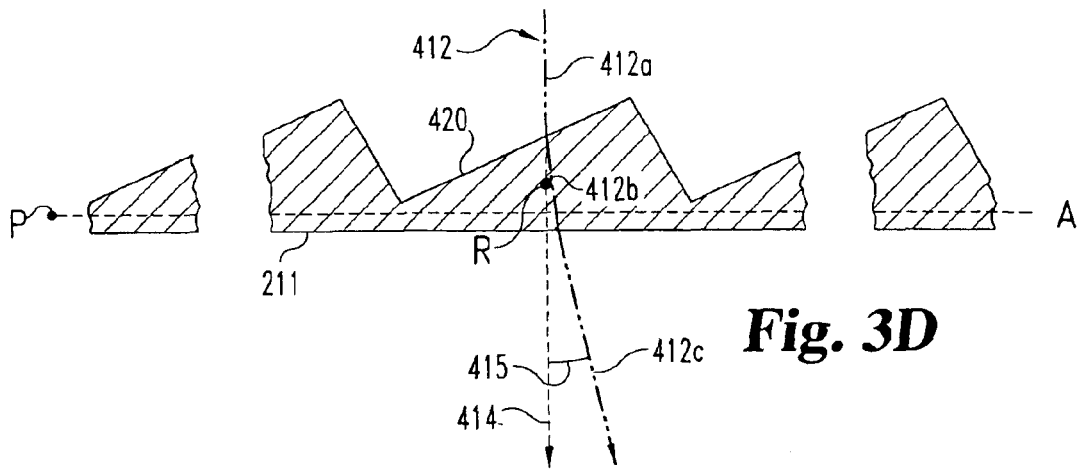
FIG. 3D is a partial sectional view of the window of FIG. 2 taken along a portion of line segment P-A including point R.

FIG. 3D shows a partial cross section of window 201 along line segment P-A including the point R. The optical properties of window 201 at point R may be described in terms of the redirection of operator line of sight 412. On the interior side of window 201 operator line of sight 412 follows path 412a until it encounters surface 420 of window 201. Surface 420 redirects operator line of sight such that it follows path 412b until it encounters surface 211 of window 201. Surface 211 redirects operator line of sight 412 such that it follows path 412c.

Path 414 shows the direction that operator line of sight would have taken if it had not been redirected by window 201. The difference between path 414 and path 412c may be measured by angle 415. Thus, window 201 provides for a particular redirected operator line of sight at point R.

Figure 3E:
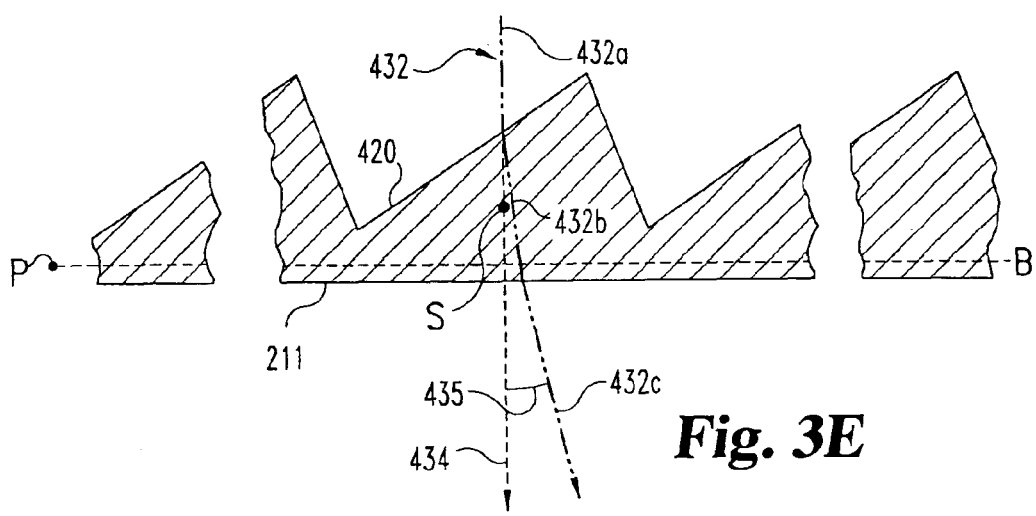
FIG. 3E is a partial sectional view of the window of FIG. 2 taken along a portion of line segment P-B including point S.

FIG. 3E shows a partial cross section of window 201 along line segment P-B including the point S. The optical properties of window 201 at point S may be described in terms of the redirection of operator line of sight 432. On the interior side of window 201 operator line of sight 432 follows path 432a until it encounters surface 420 of window 201. Surface 420 redirects operator line of sight such that it follows path 432b until it encounters surface 211 of window 201. Surface 211 again redirects operator line of sight 432 such that it follows path 432c.

Path 434 shows the direction that operator line of sight would have taken if it had not been redirected by window 201. The difference between path 434 and path 432c may be measured by angle 435. Thus, window 201 provides for a particular redirected operator line of sight at point S.

Figure 3F:
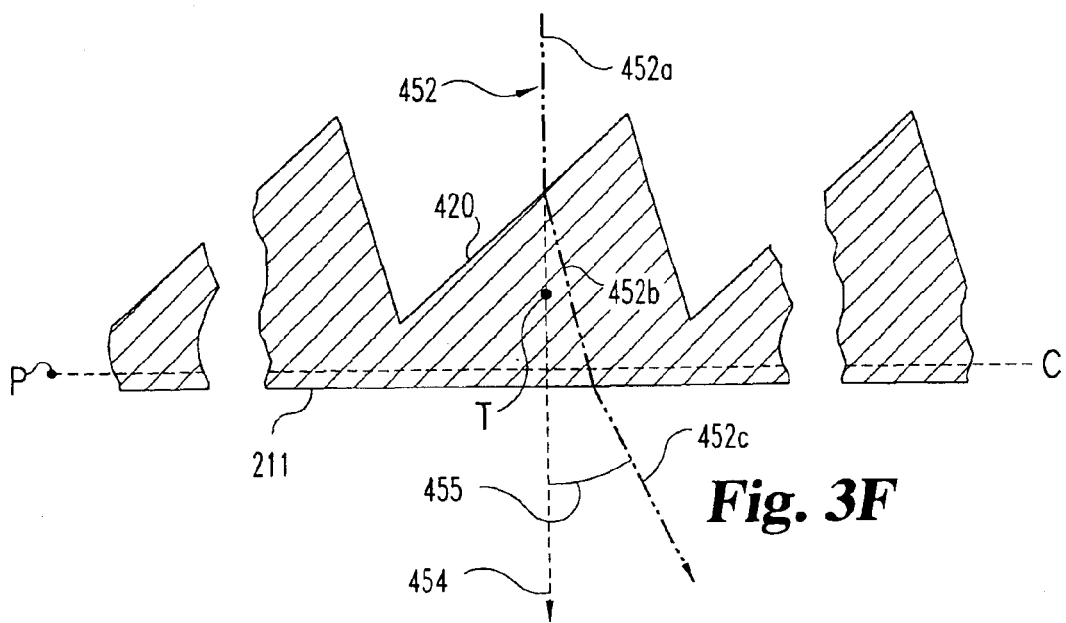
FIG. 3F is a partial sectional view of the window of FIG. 2 taken along a portion of line segment P-C including point T.

FIG. 3F shows a partial cross section of window 201 along line segment P-C including the point T. The optical properties of window 201 at point T may be described in terms of the redirection of operator line of sight 452. On the interior of window 201 operator line of sight 452 follows path 452a until it encounters surface 420 of window 201. Surface 420 redirects operator line of sight such that it follows path 452b until it encounters surface 211 of window

201. Surface 211 again redirects operator line of sight 452 such that it follows path 452c.

Path 454 shows the direction that operator line of sight would have taken if it had not been redirected by window 201. The difference between path 454 and path 452c is measured by redirection angle 455. Thus, window 201 provides for a particular redirected operator line of sight at point T.

Referring now to FIGS. 3D, 3E and 3F, the differences between redirected operator lines of sight at points R, S and T will be described. Redirection angle 435 is greater than redirection angle 415 and that redirection angle 455 is greater than redirection angle 435. Thus, window 201 provides different degrees of redirection of operator line of sight at different points. Additionally, it should be understood that differences in redirection at various points of window 201 correlate to the variation in the dimensions of the grooves and ridges of window 201 as described above in connection with FIGS. 3A, 3B and 3C. For example, the increase in height of a ridge of window 201 from the intersection of line P-A to that of line P-B results in a greater redirection of operator line of sight.

It should be understood that the paths and angles of redirection shown in FIGS. 3D, 3E and 3F have been drawn to illustrate their relationship to one another and are not necessarily to scale. By way of example and not limitation, the actual angle of redirection at point R might be three degrees or nearly zero. The angle of redirection along a point on line P-D may be twenty degrees. The angle of redirection at point S may be twenty two degrees. Thus, the window 201 provides the greatest angle of redirection in the aft direction. It will be appreciated that the actual angles of redirection may vary in individual embodiments depending, for example, upon the type of vehicle in which the window is installed, the position of installation relative to the operator's eye, and the size of the driver. These and other factors may be accounted for with custom prescriptions in particular applications. In one non-limiting example, the angles of redirection can be about 5 degrees in the up direction, about 40 degrees in the down and fore directions and about 35 degrees in the aft direction.

Figure 4:
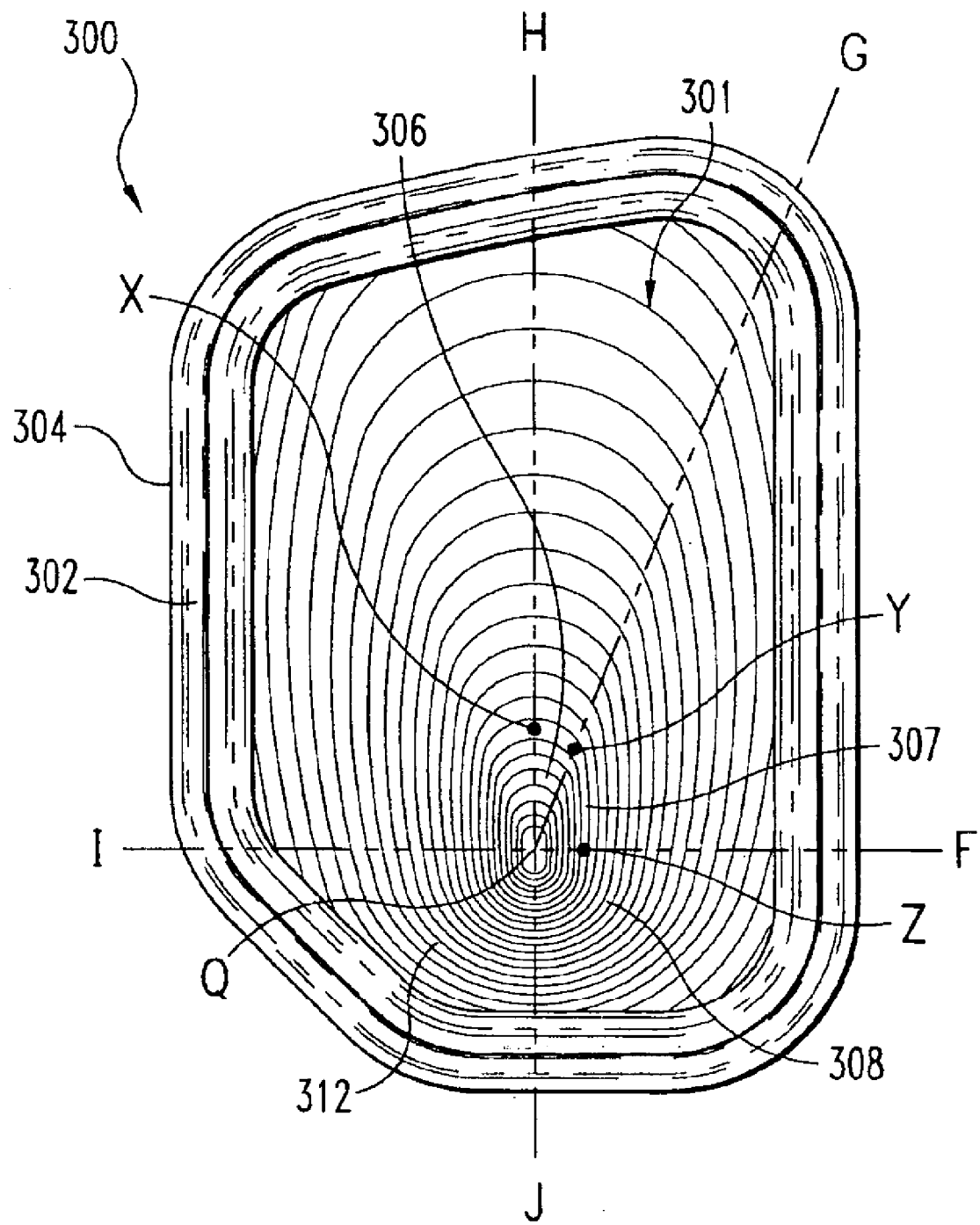
FIG. 4 is an interior view of a vehicle window according to another embodiment of the present invention.

FIG. 4 shows a vehicle window assembly 300 according to another embodiment of the present invention. Assembly 300 is configured to be received in a porthole provided in the passenger side door of a semi cab. Assembly 300 includes one-piece window 301 that may be formed of polycarbonate or any other transparent material as discussed above. Assembly 300 further includes gasket 304 for forming a seal between the window and the porthole. Gasket 304 includes a contour 302 similar to contour 202 described above in connection with FIG. 2. When received in a porthole formed in a vehicle, window 301 has interior and exterior surfaces that redirect light which travels through window 301.

The optics of window 301 differ from those of window 201, but accomplish a similar redirections of a vehicle operator's line of sight. Thus, the portion of vehicle window 301 bounded by line segments Q-H and Q-F provides redirected operator lines of sight similar to those of the portion of window 201 bounded by line segments P-A and P-C. The portion of vehicle window 301 bounded by line segments Q-F and Q-J provides redirected operator lines of sight similar to those of the portion of window 201 bounded by line segments P-C and P-D. The portion of vehicle window 301 bounded by line segments Q-J and Q-I provides redirected operator lines of sight similar to those of the portion of window 201 bounded by line segments P-D and P-E. The portion of vehicle window 301 bounded by line segments Q-I and Q-H provides redirected operator views similar to those of the portion of window 201 bounded by line segments P-E and P-A. Additionally, the redirections of the portions of window 301 bounded by line segments Q-H and Q-G relative to the portion bounded by line segments Q-G and Q-F is similar to the relationship between the portion bounded by line segments P-A and P-B relative to that bounded by line segments P-B and P-C in window 201. Furthermore, the variations and alternatives described in connection with the redirection of window 201 may also apply to window 301.

Window 301 includes multiple optical rings that represent ridges and/or grooves of one side of window 201 that are disposed about optical center Q. For clarity of illustration and description only optical rings 306, 307 and 308 have been numbered, however, it should be understood that numerous other similarly illustrates optical rings are included in window 301. Additionally, the optical rings of window 301 have been shown as having a sufficiently large size for clarity of illustration. It should be understood however, that the ridges and/or grooves of window 301 may be of a smaller size than represented in FIG. 4. The optical rings of window 301 are disposed about optical center Q in a non-circular, non-concentric configuration. It should be understood that other configurations as previously mentioned are within the scope of the invention.

Figure 5A:
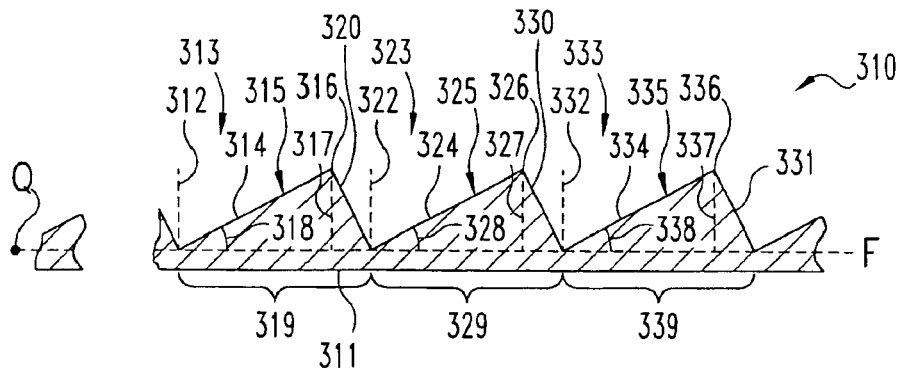
FIG. 5A is a partial sectional view of the window of FIG. 3 taken along line segment Q-F.
Figure 5B:
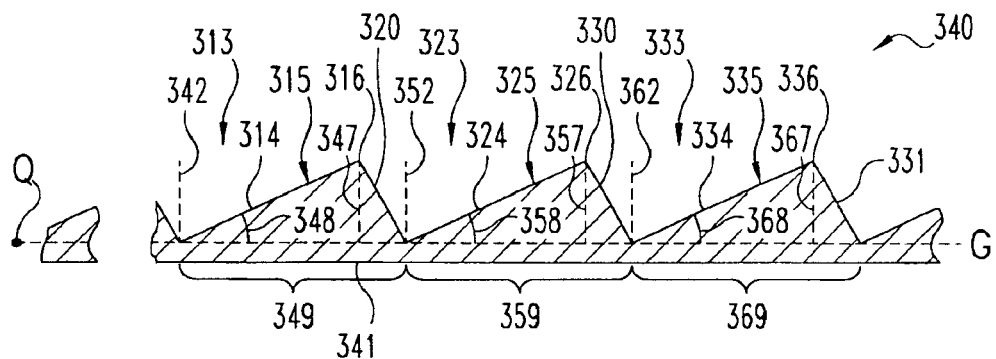
FIG. 5B is a partial sectional view of the window of FIG. 3 taken along line segment Q-G.
Figure 5C:
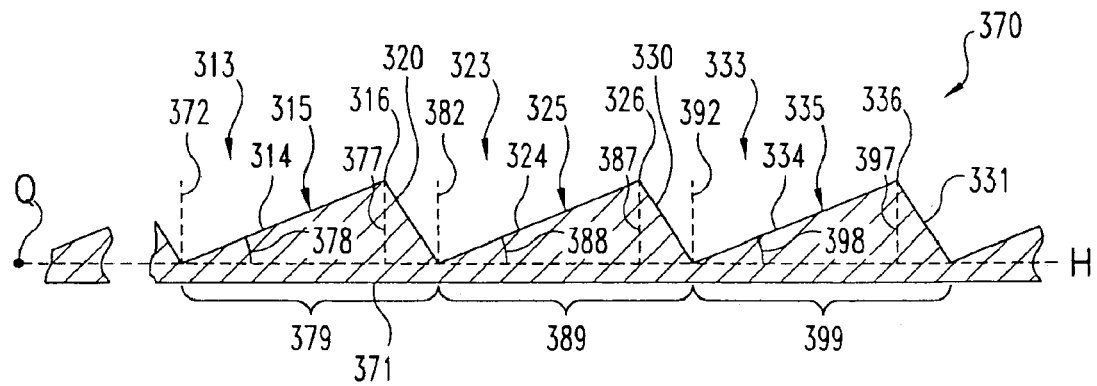
FIG. 5C is a partial sectional view of the window of FIG. 3 taken along line segment Q-H.

Referring now to FIGS. 5A, 5B and 5C the optics of window 301 will be described in detail. FIGS. 5A, 5B and 5C show partial cross sections 310, 340 and 370 of window 301 taken along line segments Q-F, Q-G and Q-H, respectively. FIGS. 5A, 5B and 5C show that one side of window 301 is substantially planar surface 311. The opposing side of window 301 includes ridges 315, 325 and 335 and grooves 313, 323 and 333. The ridges and grooves of the opposing side of window 301 define multiple surfaces 314, 320, 324, 330, 334 and 331. Furthermore, ridges 315, 325 and 335 include ridge peaks 316, 326, and 336, respectively. It should be understood that window 301 includes numerous other ridges and groves and that only ridges 315, 325 and 335 and grooves 313, 323 and 333 have been illustrated and described for the sake of clarity of illustration and description.

Turning now specifically to FIG. 5A various dimensions of the ridges and grooves of window 301 will be described. For example, in the cross section taken along the line segment Q-F, ridges 315, 325 and 335 can be described by their heights which are shown by dashed line segments 317, 327 and 337, respectively and can be, for example, about 0.5 millimeters. In the same cross section, ridges 315, 325 and 335 can also be described by their pitches which are indicated by braces 319, 329 and 339, respectively. Also in the cross section taken along line Q-F, grooves 313, 323 and 333 can be described by their depths which are shown by dashed line segments 312, 322 and 332, respectively. In the same cross section, grooves 313, 323 and 333 can be described by their widths which can be defined in terms of the distance between maximum ridge heights, for example, the maximum width of groove 323 is the distance between ridge peak 316 and ridge peak 326. Still in the cross section taken along line Q-F, ridges 315, 325 and 335, can be further described in terms of angles 318, 328 and 338, respectively. Angles 318, 328 and 338 indicate the angular position of surfaces 314, 324 and 334, respectively, relative to line Q-F. Angles 318, 328 and 338 can also be used to describe grooves 313, 323 and 333.

With continued reference to FIG. 5A, it can be seen that the heights 317, 327 and 337 of ridges 315, 325 and 335, respectively, are substantially the same. It should be understood, however, that variation of the heights of ridges of as stated above is contemplated as within the scope of the invention. Furthermore, it should be understood that the description of the variation of heights of ridges may also be applied to the depths 312, 322 and 332 of grooves 313, 323 and 333, respectively, as previously stated.

As shown in FIG. 5A, the pitches 319, 329 and 339 of ridges 315, 325 and 335, respectively, are of apparently substantially the same magnitude. As shown in FIG. 4, however, the pitches of the ridges along a different portion of a line segment defined in window 301 may vary. For example, the magnitude of successive pitches might increase or decrease along the direction from point Q outward. The difference in illustration is accounted for by the fact that the view of FIG. 4 shows a greater range of successive rings over which the above variation in pitches may be apparent while the view of FIG. 5A shows a particular portion in detail and over such a range the variation apparent in FIG. 4 may not be perceptible or may not occur. It should be understood, however, that over a greater or different range variation according to or similar to FIG. 4 could occur. Additionally, it should be understood that the description of the variation of pitches of ridges may also apply to the maximum widths of grooves.

Referring now additionally to FIGS. 5B and 5C, variation of the ridges 315, 325 and 335 and grooves 313, 323 and 333 of window 310 about optical center Q will be described. FIG. 5B shows a partial cross section of ridges 315, 325 and 335 and grooves 313, 323 and 333 taken along the line segment Q-G. In FIG. 5B ridges 315, 325 and 335 have heights 347, 357 and 367, respectively, which have the same magnitude as heights 317, 327 and 337, respectively. As previously stated, however, the invention contemplates that the magnitude of the heights of ridges may vary about optical center Q.

With continuing reference to FIGS. 5A, 5B and 5C, it can be seen that the pitches of the ridges of window 310 vary about optical center Q. For example, the magnitude of pitch 319 of ridge 315 at taken along line segment Q-F is less than the magnitude of pitch 349 of ridge 315 taken along line segment Q-G. Similarly, the magnitude of pitch 349 of ridge 315 at taken along line segment Q-G is less than the magnitude of pitch 379 of ridge 315 taken along line segment Q-H. Corresponding variation in the magnitude of the pitches of ridges 325 and 335 is also shown in FIGS. 5A, 5B and 5C. For example the magnitude of pitch 329 is less than that of pitch 359 which is less than that of pitch 389. Additionally, the magnitude of pitch 339 is less than that of pitch 369 which is less than that of pitch 399. Furthermore, it should be understood that the variation in the pitches of the ridges of window 301 is preferably smooth and continuous.

It should be understood that variations in the pitches of the ridges of window 301 are not limited to increases over a given range. For example, over a certain range, the pitch of a ridge may continuously and smoothly decrease. Furthermore, over a certain range, the pitch of a ridge may first continuously and smoothly decrease and then continuously and smoothly increase or vice-versa. The nature of the variation in pitches of ridges over their length about optical center Q will be motivated by the desired optical characteristics of window 201. Additionally, it should be appreciated that the variation of widths of grooves of window 301 may be of a fashion analogous to that described for ridges. Thus, the maximum width of grooves 313, 323 and 333 may smoothly and continuously vary from line segments Q-F to Q-G to Q-H as well as through other regions about optical center Q. Additionally, it should be understood that the variation of ridges and/or grooves of windows according to other embodiments may include combinations of the different variations described in connection with windows 201 and 301. Thus, the present invention contemplates that ridges about an optical center may vary both in their height and pitch and, similarly, the grooves about an optical center may vary both in their depth and width.

Figure 5D:
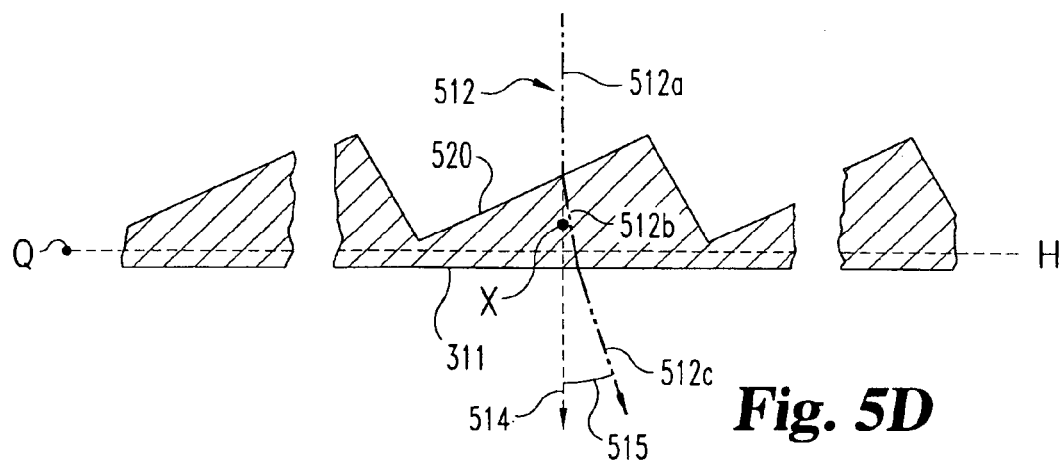
FIG. 5D is a partial sectional view of the window of FIG. 3 taken along a portion of line segment Q-H including point X.

FIG. 5D shows a partial cross section of window 301 along a portion of line segment Q-H including point X. The optical properties of window 301 at point may be described in terms of the redirection of operator line of sight 512. On the interior of window 301 operator line of sight 512 follows path 512a until it encounters surface 520 of window 301. Surface 520 redirects operator line of sight such that it follows path 512b until it encounters surface 311 of window 301. Surface 311 again redirects operator line of sight 512 such that it follows path 512c.

Path 514 shows the direction that operator line of sight would have taken if it had not been redirected by window 401. The difference between path 514 and path 512c may be measured by angle 515. Thus, window 301 provides for a particular redirected operator line of sight at point X.

Figure 5E:
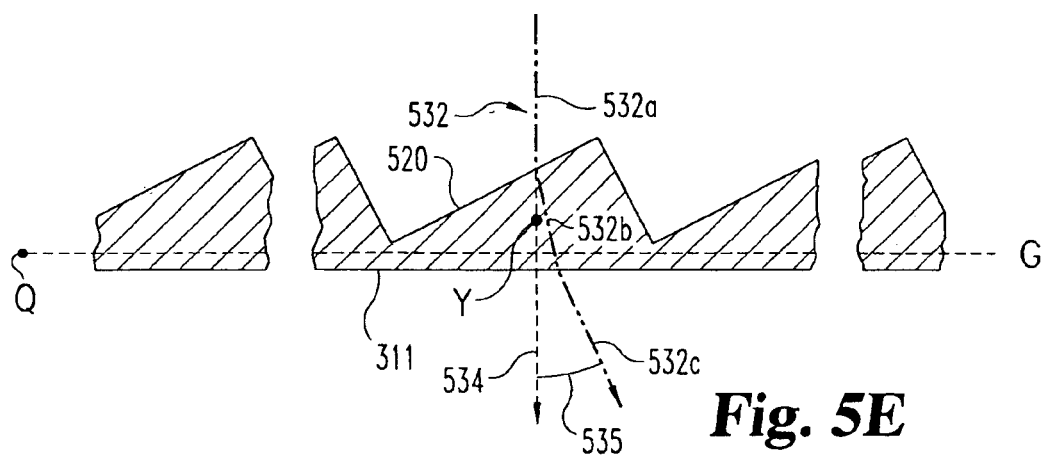
FIG. 5E is a partial sectional view of the window of FIG. 3 taken along a portion of line segment Q-G including point Y.

FIG. 5E shows a partial cross section of window 301 along line Q-G including the point Y. The optical properties of window 301 at point Y may be described in terms of the redirection of operator line of sight 532. On the interior of window 301 operator line of sight 532 follows path 532a until it encounters surface 520 of window 301. Surface 520 redirects operator line of sight such that it follows path 532b until it encounters surface 311 of window 301. Surface 311 again redirects operator line of sight 532 such that it follows path 532c.

Path 534 shows the direction that operator line of sight would have taken if it had not been redirected by window 301. The difference between path 534 and path 532c may be measured by angle 535. Thus, window 301 provides for a particular redirected operator line of sight at point Y.

Figure 5F:
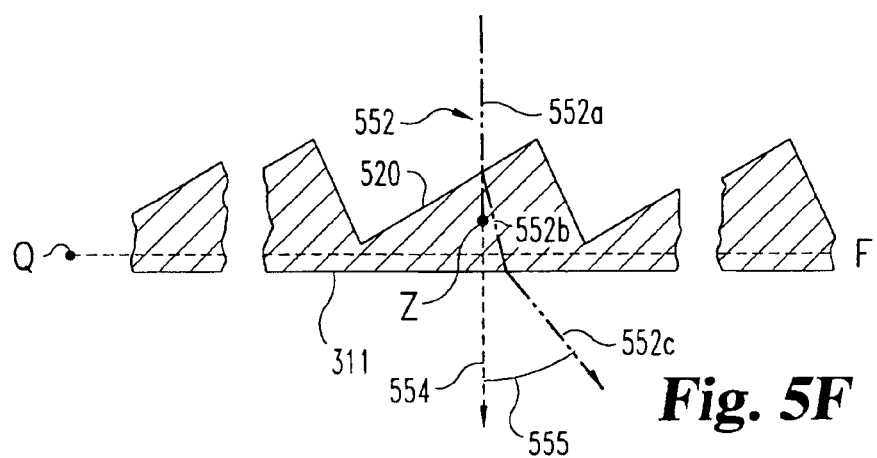
FIG. 5F is a partial sectional view of the window of FIG. 3 taken along a portion of line segment Q-F including point Z.

FIG. 5F shows a partial cross section of window 301 along line Q-F including the point Z. The optical properties of window 301 at point Z may be described in terms of the redirection of operator line of sight 552. On the interior of window 301 operator line of sight 552 follows path 552a until it encounters surface 520 of window 301. Surface 520 redirects operator line of sight such that it follows path 552b until it encounters surface 311 of window 301. Surface 311 again redirects operator line of sight 552 such that it follows path 552c.

Path 554 shows the direction that operator line of sight would have taken if it had not been redirected by window 301. The difference between path 554 and path 552c is measured by redirection angle 555. Thus, window 301 provides for a particular redirected operator line of sight at point Z.

Referring now to FIGS. 5D, 5E and 5F, the differences between redirected operator lines of sight at points X, Y and Z will be described. Redirection angle 535 is greater than redirection angle 515 and that redirection angle 555 is greater than redirection angle 535. Thus, window 301 provides different degrees of redirection of operator line of sight at different points.

Additionally, it should be understood that variation in the degree of redirection may correlate to the variation in the dimensions of the grooves and ridges of window 301 as described above in connection with FIGS. 5A, 5B and 5C. For example, the increase in the pitch of a ridge from the intersection of line Q-F to that of line Q-G results in a greater angular redirection of operator line of sight at point Z than at point Y.

It should be understood that the paths and angles of redirection shown in FIGS. 5D, 5E and 5F have been drawn to illustrate their relationship to one another and are not to scale. For example, the actual angle of redirection at point X might be three degrees. The angle of redirection along a point on line Q-J may be twenty degrees. The angle of redirection at point Z may be twenty three degrees. Thus, the window 301 provides the greatest angle of redirection in the down direction. It will be appreciated that the actual angles of redirection may vary in individual embodiments depending, for example, upon the type of vehicle in which the window is installed, the position of installation relative to the operator's eye, and the size of the driver. These factors and others may be accounted for with custom prescriptions in particular applications. In one non-limiting example, the angles of redirection can be about 5 degrees in the up direction, about 40 degrees in the down and fore directions and about 35 degrees in the aft direction.

While the invention has been illustrated and described in detail in the drawings and foregoing description, the same is to be considered as illustrative and not restrictive in character, it being understood that only selected embodiments have been shown and described and that all equivalents, changes, and modifications that come within the spirit of the inventions as defined herein or by the following claims are desired to be protected.

What is claimed is:

1. An apparatus comprising:
   a vehicle window including a first window side and a second window side opposite the first window side, the window including an optical center wherein the optical center of the vehicle window is offset from the geometric center of the vehicle window;
   a plurality of grooves defined by the first window side, the grooves having a positioning about the optical center, the grooves having a number of dimensions including a depth and a width, the grooves defining surfaces effective to redirect light that passes through said window;
   wherein at least one dimension of the grooves is varied about the optical center effective to provide a plurality of angles of light redirection about the optical center.

2. The vehicle window of claim 1 wherein the positioning of the grooves about the optical center is concentric.

3. The vehicle window of claim 2 wherein the concentric positioning of the grooves about the optical center is substantially circular.

4. The vehicle window of claim 1 wherein the at least one dimension of the grooves being varied about the optical center includes the depth of the grooves being varied about the optical center.

5. The vehicle window of claim 1 wherein the at least one dimension of the grooves being varied about the optical center includes the width of the grooves being varied about the optical center.

6. The vehicle window of claim 1 wherein the at least one dimension of the grooves being varied about the optical center includes substantially continuous variation.

7. The vehicle window of claim 1 wherein the second window side is exposed to the exterior of a vehicle.

8. An apparatus comprising:
   a window for a vehicle door including a first window side and a second window side, the window including an optical center wherein the optical center of the window is different from the geometric center of the window;
   a plurality of ridges defined the first window side, the ridges having a positioning about the optical center, the ridges having a number of dimensions including a height and a pitch, the ridges defining surfaces effective to redirect light that passes through said window;
   wherein at least one dimension of the ridges is varied about the optical center effective to provide a plurality of angles of light redirection about the optical center.

9. The vehicle window of claim 8 wherein the positioning of the ridges is concentric.

10. The vehicle window of claim 9 wherein the concentric positioning of the ridges is non-circular.

11. The vehicle window of claim 8 wherein the at least one dimension of the ridges being varied about the optical center includes the height of the ridges being varied about the optical center.

12. The vehicle window of claim 8 wherein the at least one dimension of the ridges being varied about the optical center includes the pitch of the ridges being varied about the optical center.

13. The vehicle window of claim 8 wherein the at least one dimension of the ridges being varied about the optical center includes substantially continuous variation.

14. The vehicle window of claim 8 wherein the second window side faces the exterior of a vehicle.

15. An apparatus comprising:
   a vehicle porthole window including a first window side and a second window side, the window including an optical center;
   a plurality of grooves defined by the first window side, the grooves having a positioning about the optical center, the grooves having a number of dimensions including and a depth and a width, the grooves defining fresnel optical surfaces effective to redirect light that passes through said window;
   wherein at least one dimension of the grooves being substantially continuously varied about the optical center effective to provide a plurality of angles of light redirection about the optical center wherein the optical center of the window is different from the geometric center of the window.

16. The window of claim 15 wherein the at least one dimension of the grooves being substantially continuously varied about the optical center includes the depth of the grooves being substantially continuously varied about the optical center.

17. The window of claim 15 wherein the at least one dimension of the grooves being substantially continuously varied about the optical center includes the width of the grooves being substantially continuously varied about the optical center.

18. The window of claim 15 further comprising a gasket disposed intermediate the window and the porthole, the gasket forming a seal between the vehicle and the window.

19. The window of claim 15 wherein the window is installed in a porthole defined in the door of a vehicle.

* * * * *